Figure 1:
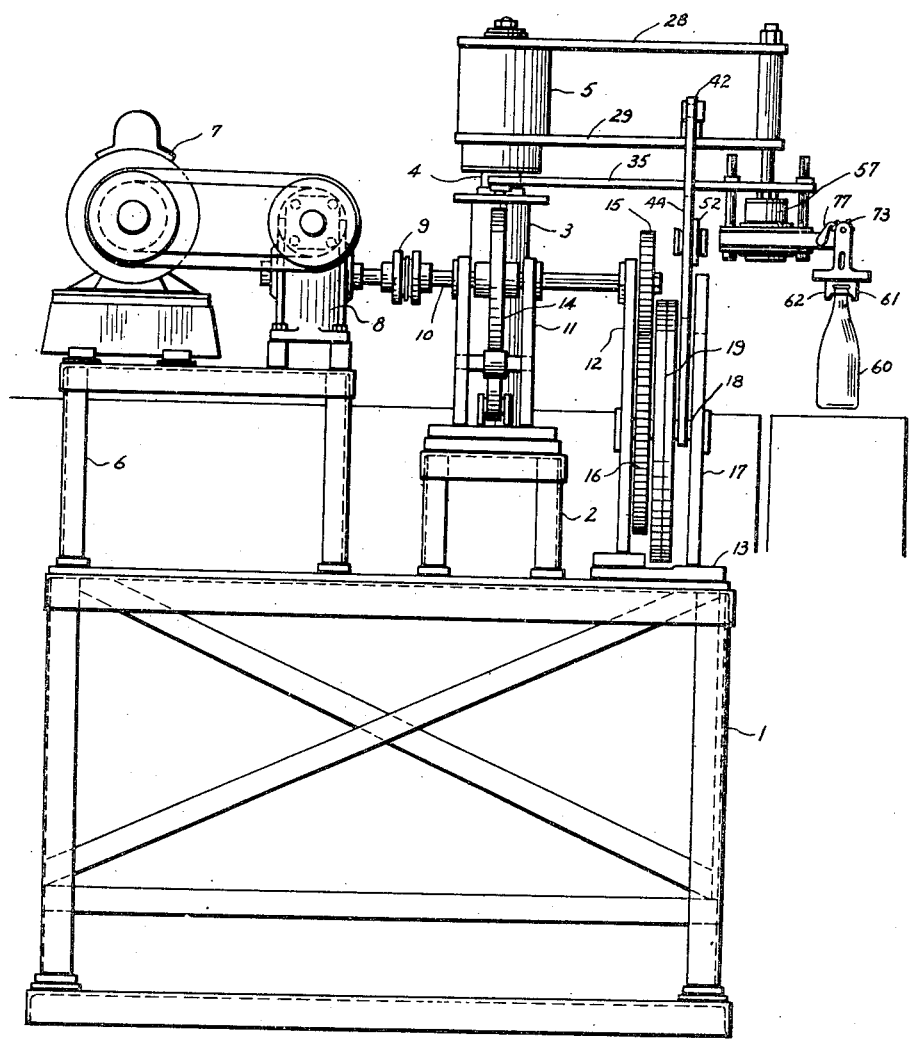

Sept. 16, 1952  A. L. STECK  2,610,746
BOTTLE STACKER

Filed Dec. 8, 1948  6 Sheets-Sheet 1

INVENTOR.
Arch L. Steck
BY William B. Jaspert
Attorney.

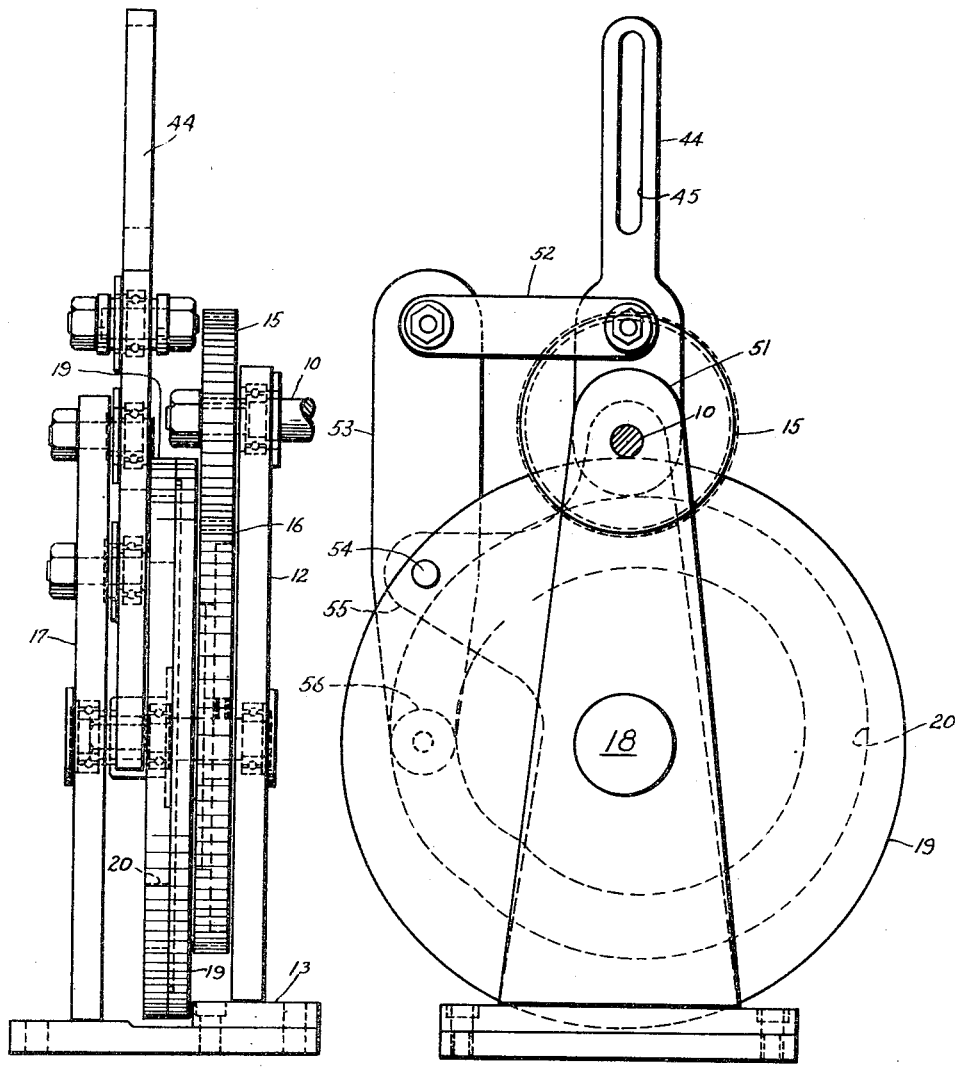

INVENTOR.
Arch L. Steck
BY William B. Jaspert
Attorney.

Sept. 16, 1952  A. L. STECK  2,610,746
BOTTLE STACKER

Filed Dec. 8, 1948  6 Sheets-Sheet 6

INVENTOR.
Arch L. Steck
BY William D. Jaspert
Attorney.

Patented Sept. 16, 1952

2,610,746

UNITED STATES PATENT OFFICE 2,610,746

BOTTLE STACKER

Arch L. Steck, Oil City, Pa.

Application December 8, 1948, Serial No. 64,130

3 Claims. (Cl. 214—1)

This invention relates to new and useful improvements in apparatus for transferring glass bottles and the like from a receiving station, such as a conveyor belt, to a loading station, such as the conveying belt of an annealing lehr, apparatus for this purpose being commonly termed stackers in the industry.

It is among the objects of this invention to provide a stacker which shall be capable of receiving rows of bottles from a conveyor belt on which the bottles are disposed in rows longitudinally of the belt, or, in other words, coaxially with the line of movement of the belt, and deliver them to the conveying mechanism of a lehr or the like in rows transversely of the moving axis of the belt or conveyor, or vice versa.

It is another object of the invention to provide a stacker having gripping means for engaging rows of glass bottles which shall function to automatically close when the gripping jaws or bars are lowered over the row of bottles, and to automatically open to release the row of bottles when they have been placed on the receiving strand of the lehr conveyor.

Another object of the invention is to provide a stacker in which the bottle clamping and releasing means is coordinated with the swinging movement of the transfer arm and in which the transfer mechanism is adapted for vertical movement when the bottle gripping means are in register with the rows of bottles at the receiving station and when the gripping means have reached the delivery position at the charging station of the annealing lehr.

Still a further object of the invention is to provide a stacker in which the bottle gripping means is locked in its open or closed position during the transfer movement of the apparatus from the receiving to the charging positions and vice versa.

The invention will become more apparent from a consideration of the accompanying drawings, constituting a part hereof, in which like reference characters designate like parts, and in which—

Figure 2:
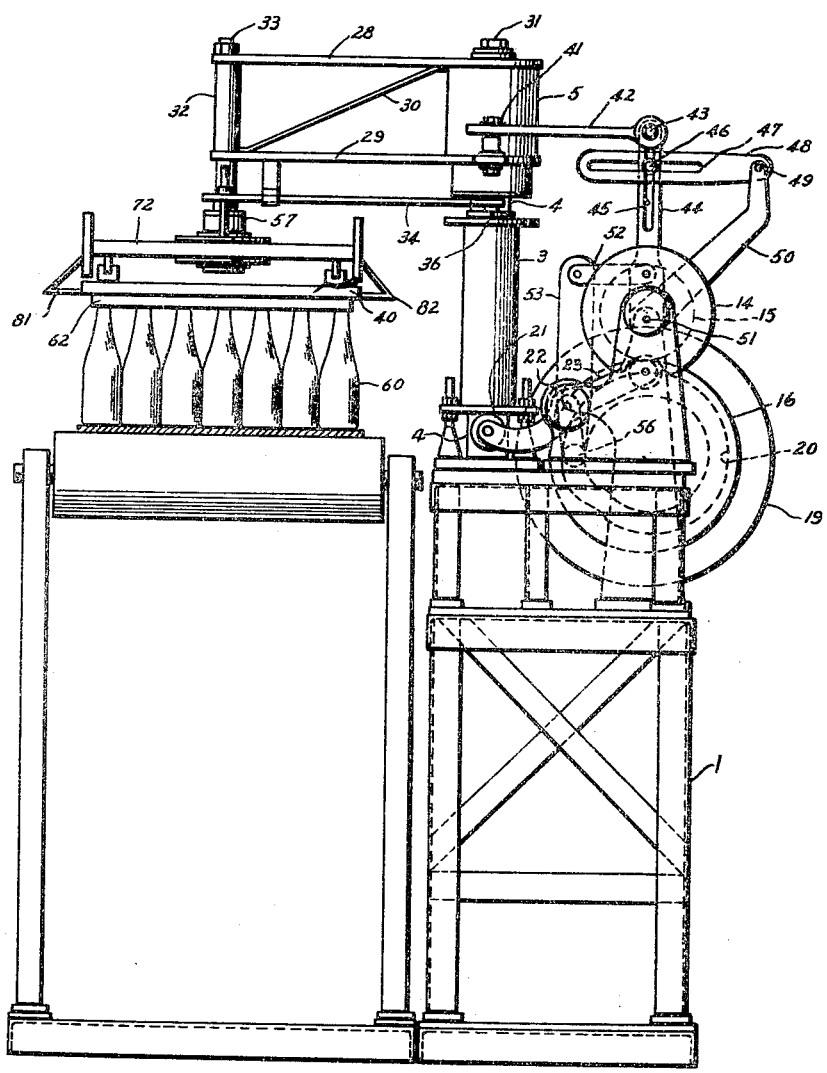
Figure 5:
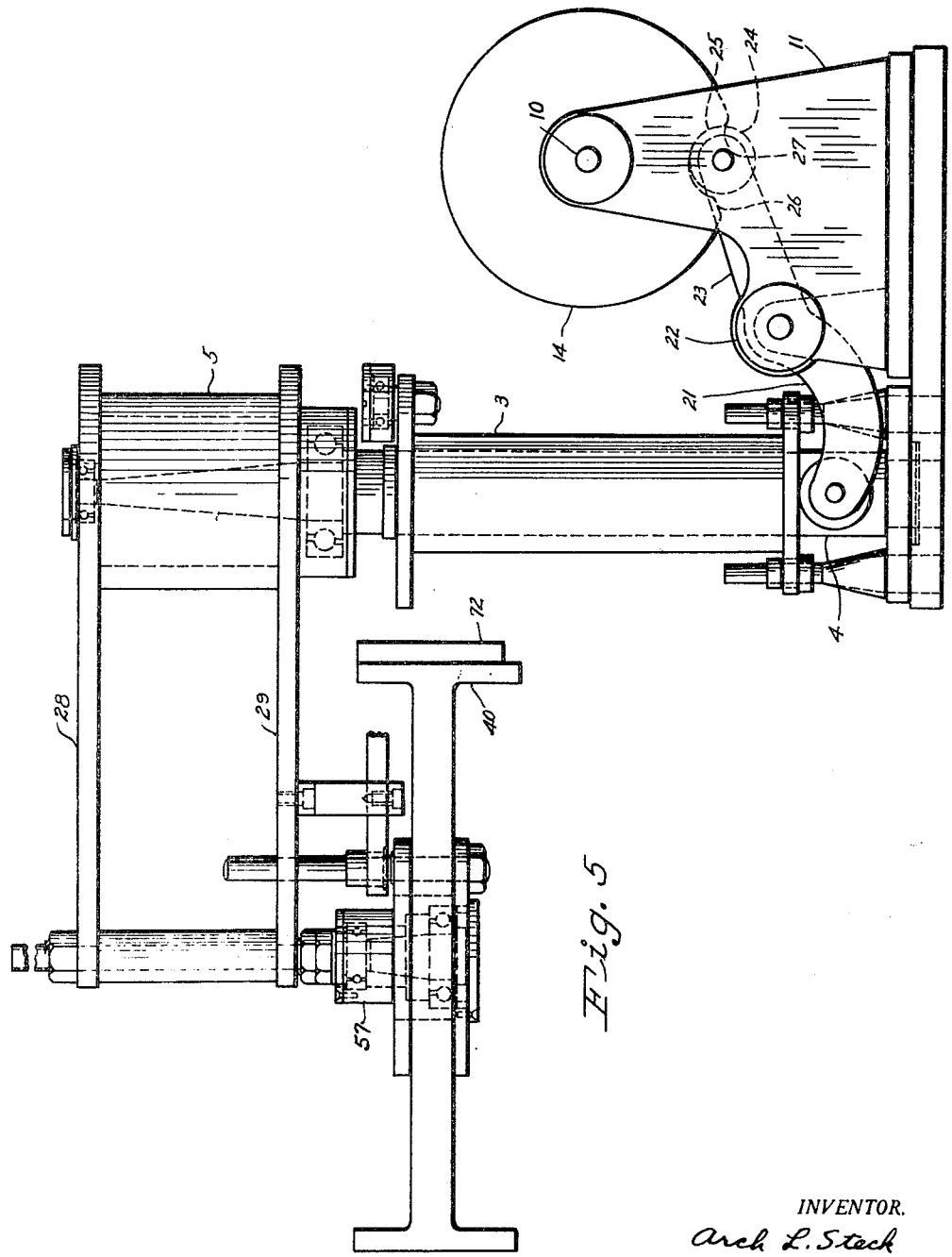
Figure 6:
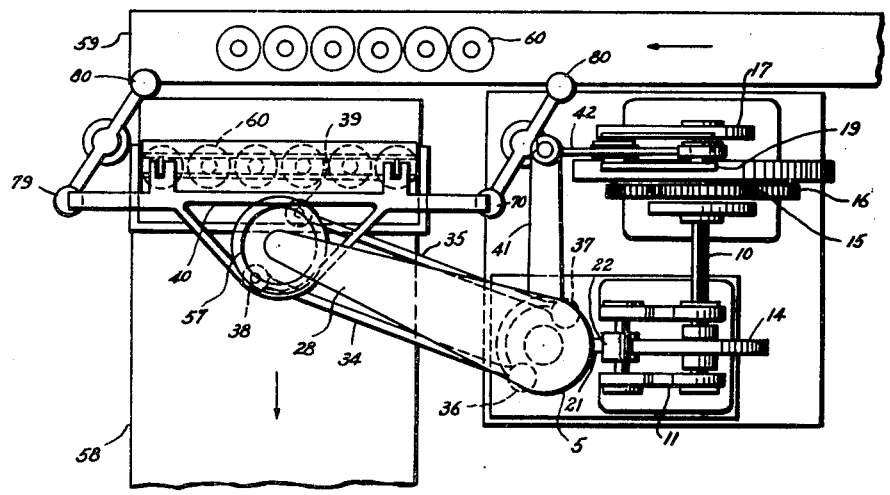
Figures 7, 8:
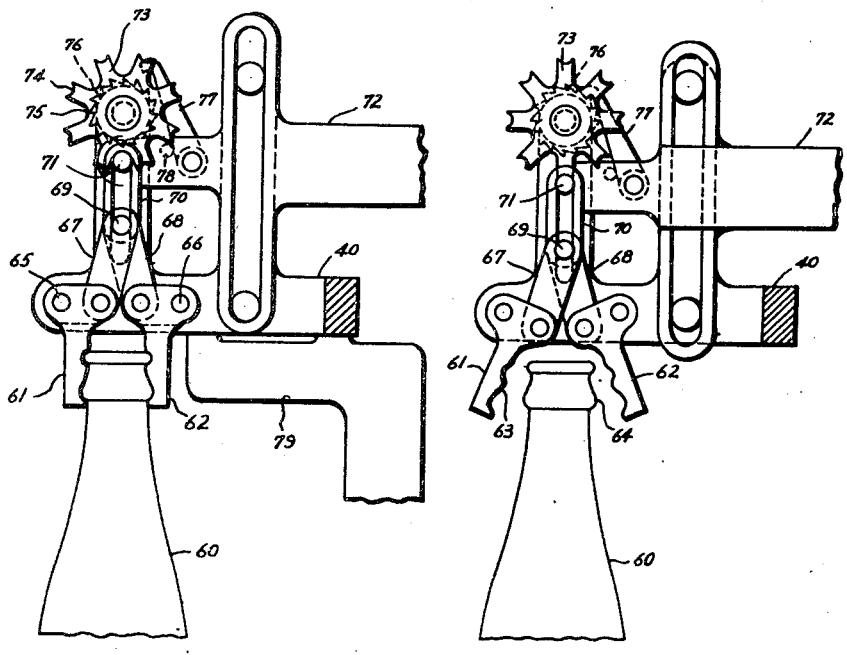
Figure 10:
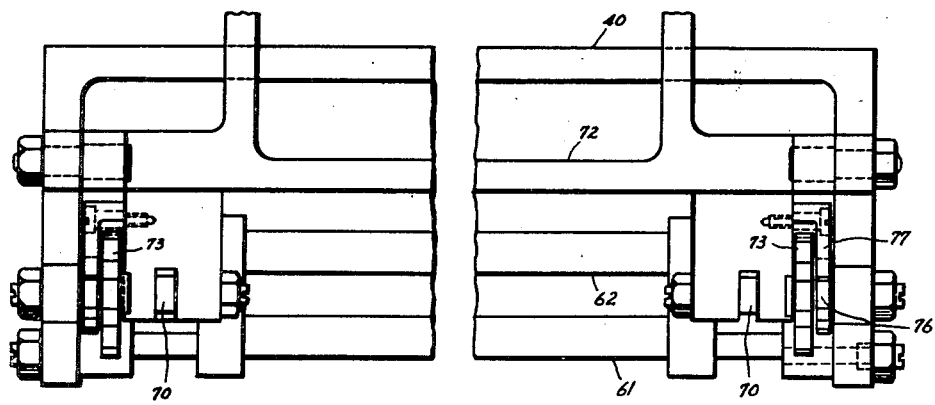
Figure 11:
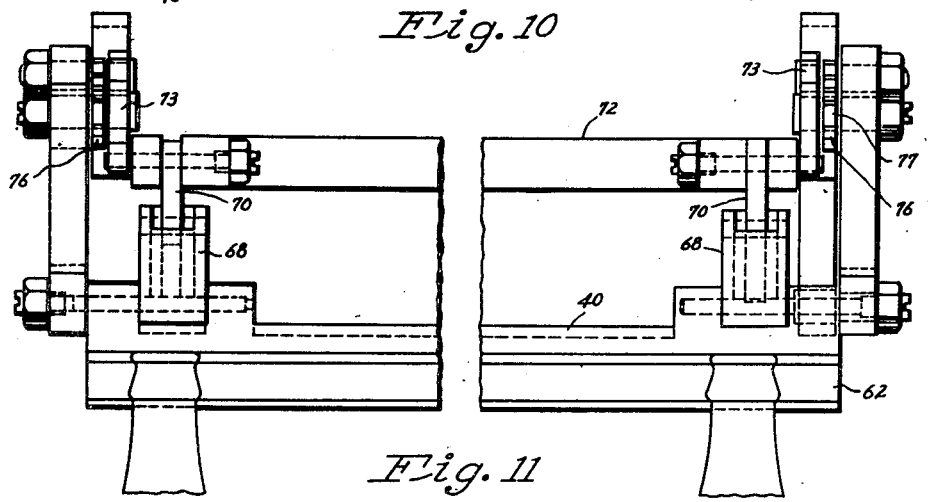
Figure 9:
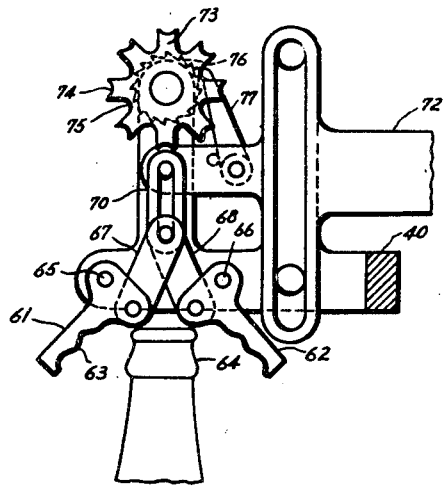

Fig. 1 is a side elevational view of a stacker embodying the principles of this invention;

Fig. 2 a rear elevational view thereof;

Fig. 3 a side elevational view of the stacker drive;

Fig. 4 a rear elevational view thereof;

Fig. 5 a rear elevational view of the stacker mechanism and a portion of the drive mechanism therefor;

Fig. 6 a top plan view of the stacker;

Fig. 7 a side elevational view of the bottle gripping mechanism with the gripper jaws closed;

Fig. 8 a similar view with the gripping jaws partially open;

Fig. 9 a similar view with the gripping jaws in the wide open position;

Fig. 10 a top plan view of the gripping device and actuating mechanism therefor; and Fig. 11 a front elevational view of the mechanism shown in Fig. 10.

With reference to the several figures of the drawing, the numeral 1 designates a supporting frame on which is mounted a rectangular frame 2 for supporting a cylindrical housing 3 in which is journaled a vertical shaft 4 that carries the transfer mechanism, generally designated by the numeral 5. Also mounted on the frame 1 is a frame 6 for carrying a drive motor 7 and a gear transmission 8, the latter being coupled at 9 to a shaft 10 journaled on bearings 11 mounted on frame 2 and a pillar block bearing 12 mounted on a base 13. Shaft 10 carries a cam 14 and a gear wheel 15, the latter interacting with the teeth of a gear wheel 16 journaled in the bearing 12 and a pillar block bearing 17 for driving a shaft 18 on which is mounted a cam 19, the cam 19 having a cam groove 20 as shown in Figs. 2 and 4 of the drawings.

The transfer mechanism spindle 4 is subjected to vertical movement by a lever 21 pivotally connected to the spindle 4 as shown in Figs. 2 and 5, lever 21 being a bell crank lever pivoted at 22 and having an arm 23 with a cam follower 24 that engages the outer face of cam 14. The latter is provided with a cam groove 25. The cam 14 is of cylindrical shape except for the groove 25 and the flat and rounded faces 26 and 27 of the cam 14. When the follower 24 drops in the groove 25, the spindle 4 drops as does the entire transfer mechanism which the spindle 4 supports, and upon further rotation of the cam 14 the follower 24 rides out of the groove 25, depressing lever 23 and raising spindle 4 to lift the transfer mechanism.

The transfer mechanism, as shown in Figs. 1, 2 and 6, consists of a pair of triangular shaped frames 28 and 29 having a cross brace 30, the frames being connected at the rear to spindle 4 by a bolt 31 and being joined at the front by a spacer sleeve 32 fastened by a bolt 33. The transfer arms 28 and 29 are journaled on the spindle 4 by the housing, designated by the reference numeral 5, to be freely movable thereon in a lateral plane, and are controlled in their movements by links 34 and 35 pivoted to the spindle housing 3 at 36 and 37, as shown in Figs. 2 and 6. The transfer frames are thus controlled in their angular movement by the links which are pivoted at 38 and 39 to the gripper frame designated by the numeral 40. The frame housing 5 in turn is subjected to angular movement by a lever 41 actuated by a link 42 pivoted at 43 to a link 44, the latter being slotted at 45 to receive a pin 46 that is adjustable in a slot 47 of a link 48 pivoted at 49 to a bracket 50.

The link or lever 44 is pivoted at 51 and is connected by a link 52 pivotally connected to lever 53 that is pivoted at 54 to a bracket arm 55. Lever 53 carries a cam follower 56 that rides in the cam slot 20 of cam 19. When cam 19 rotates the lever 44 is subjected to a rocking movement which, through its connection by the link 42 with the housing 5 of the transfer mechanism, subjects the latter to angular movement within the limits of the swing of lever 44. The distance of movement of lever 44 may be adjusted by adjusting nuts 46 of the pin that is movable in the slots 45 and 47, thereby shortening the fulcrum point of the lever 44 with respect to link 48. By means of this adjustment the swing of the transfer arm 28 can be controlled as desired.

With reference to Figs. 6 to 11 inclusive of the drawings, the frame 40 is pivotally mounted on the ends of the arms 28 and 29 by a bearing housing 57, Fig. 6. The frame 40 is therefore maintained in a position parallel with the transfer axis of a conveyor belt 58 by means of the links 34 and 35. When the arms 28 and 29 are subjected to angular movement by lever 41 as described, they can be moved forward to a conveyor 59, Fig. 6, on which rows of bottles 60 are moved in the direction shown by the arrow. The conveyor 59 moves continuously bringing up rows of bottles 60 which are shown on the conveyor. They are closely spaced but do not necessarily contact and are gripped when on the conveyor 59 by gripping bars 61 and 62 which have their gripping faces 63 shaped to conform to the contour of the finish or neck 64 of the bottles 60, as shown in Fig. 8. The gripping or clamping bars 61 and 62 extend the full length of the transfer mechanism as shown in Figs. 10 and 11. They are pivotally mounted at 65 and 66 on the frame 40 and are connected by actuating links 67 and 68 that are connected at 69 to a link 70 which is pivoted by a pin 71 to a movable frame 72. When the frame 72 is subjected to movement relative to the frame 40, the link 70 will actuate the toggle links 67 and 68 which in turn actuate the clamping bars 61 and 62 to grip or release the bottle neck 64 as the case may be. The clamping or opening position of the clamping bars 61 and 62 is determined by a star wheel 73, the teeth of which are provided with grooves 74 which constitute stops for the pin 71 as shown in Fig. 8, which prevents the clamping bars 61 and 62 from closing. The star wheel 73 is grooved between the teeth, as shown at 75, these grooves constituting a stop for the pin 71 which determines the closed position of the clamping bars 61 and 62.

The star wheel 73 is indexed to the open or closed position of the clamping bars by means of a ratchet wheel 76 and a pawl 77, the pawl engaging the teeth of the ratchet wheel upon relative movement of frames 40 and 72. When the latter separate the pawl 77 is free of the ratchet wheel 76, and when frames 40 and 72 move in the direction to approach each other pawl 77 engages the teeth of the ratchet wheel 76 and indexes the star wheel 73 to the next position.

This is demonstrated in the views of Figs. 7, 8 and 9. In Fig. 7 the pin 71 is in the deep groove 75 of the star wheel and the clamping bars 61 and 62 are closed. In Fig. 8 the star wheel has been indexed by the pawl 77 and pin 71 abuts against the shallow groove 74 of the star wheel teeth which does not permit clamping bars 61 and 62 to close. In Fig. 9 the clamping bars 61 and 62 are in the wide open position, and it will be noted that in this cycle of movement of the clamping bars, frames 40 and 72 are gradually approaching from their widest point of separation in Fig. 7 to their closest point of separation in Fig. 9, Fig. 8 being intermediate the two positions of Figs. 7 and 9. A stop pin 78 prevents the pawl 77 from dropping on the ratchet at any time and maintains it in proper position to engage the teeth for indexing the star wheel when the upper frame 72 drops.

Relative movement of frames 40 and 72 is effected by means of stops 79 and 80, there being a pair of such stops at each station of movement of the stacker arm. The stops are stationary but adjustable for height to bring about the proper amount of relative movement between frames 40 and 72 and to vary the degree of indexing of the pawl 77. The frame 40, as shown in Fig. 2, may be provided with resilient brackets or arms 81 and 82 that engage the stops 79 and 80 to eliminate jarring when the stacker moves from one position to the other.

The operation of the above described stacker mechanism is briefly as follows. With rows of bottles moving in the direction of the arrow as viewed in Fig. 6, the stacker is actuated by the drive motor 7 through gear transmission 8 by rotation of shaft 10 which simultaneously drives cam 14 and the gear train 15 and 16 that operates cam 19. The vertical spindle 4 of the stacker is thereby actuated for reciprocal movement axially of the spindle which is to raise and lower the stacker frames 28 and 29 that carry the gripper mechanism. At the same time the oscillating link 42 is actuated by cam 19 in the manner described in connection with Fig. 4 of the drawings to oscillate the frames 28 and 29 about their pivot bearing 5. Links 34 and 35 maintain the gripper frame 40 in the position to align the gripper bars 61 and 62 with the rows of bottles 60 on conveyor 59 so that when the stacker has traveled to the position of conveyor 59 the bars will overlap the bottle necks 64 in the manner shown in Fig. 9. The frame 40 is then lowered when spindle 4 is lowered due to cam follower 24 falling into the cam groove 25. The spring brackets 81 and 82 will then strike the stops or abutments 80 to hold the frame 40, leaving frame 72, which is carried by the pivot bearing 57 of the frames 28 and 29, to lower. As previously described in connection with Figs. 7 to 9 inclusive, the lowering of the frame 72 causes star wheel 73 to index to bring the deep groove 75 in register with the pin 71. When the spindle 4 is then raised due to the follower 24 riding out of the cam groove 25, pin 71, which moves with frame 72, will draw the link 70 upward, thereby actuating links 67 and 68 and closing clamping bars 61 and 62. Further upward movement of the take-out mechanism will lift the bottles from the conveyor 59 and the subsequent angular or oscillating movement of link 41 actuated by cam 19 will transfer the stacker mechanism to the position shown in Fig. 6 with the six bottles aligned transversely of the conveyor 58. The latter may be a lehr conveyor for charging the bottles in rows into the lehr for annealing. When the take-out mechanism has reached the position shown in Fig. 6 of the drawings, the spindle 4 again drops and the bottles are deposited on the conveyor belt. When dropping the bars open as shown in Figs. 7, 8 and 9, and this position of the clamping bars is maintained while the take-out mechanism again swings to the conveyor 59. The cycle of lowering the clamping bar head, engaging the bottles, closing the bars and transferring the bottles to the lehr conveyor is then repeated.

While the mechanism has been described as functioning to move rows of ware from a line moving transversely of a lehr conveyor in rows across the conveyor belt, it is evident that it will operate in the reverse order by adjusting the star wheel 73 to close jaws 61 and 62 when in the position shown in Fig. 6 and to open when moved in line with conveyor 59, Fig. 6.

Although one embodiment of the invention has been herein illustrated and described, it will be evident to those skilled in the art that various modifications may be made in the details of construction without departing from the principles herein set forth. For example, the device may be employed for transferring other articles beside bottles or glass articles.

I claim:

1. Apparatus for stacking rows of bottles or the like comprising a vertical spindle mounted for rotary and axial movement, means for actuating said spindle including means for coordinating and limiting said rotary and axial movements, a gripper frame having a radial arm mounted for movement with said spindle and having a pair of gripper bars pivotally mounted on said arm, means for maintaining the axes of said bars in a fixed lateral plane, and actuating mechanism for said gripper bars, said actuating mechanism comprising a plurality of toggle links connected to said gripper bars and an actuating link therefor, a movable frame for said actuating link, a star wheel constituting an abutment for said actuating link, a ratchet wheel for actuating said star wheel, and a pawl carried by said movable frame for engaging the teeth of the ratchet whereby the star wheel is indexed in response to vertical movement of said gripper mechanism to actuate the toggle links to close and open said gripper bars.

2. Apparatus for engaging rows of bottles moving longitudinally on a conveyor and for depositing said rows of bottles transversely to the line of movement of a second conveyor comprising a support for a gripper mechanism adapted for rotary and axial movement, means for actuating said support including means for coordinating and limiting said rotary and axial movements, a radial arm on said support, a frame pivotally mounted on said arm, links for maintaining said frame in fixed relation to said moving conveyors during the rotary and axial movement of said support, a second frame linked to said first-named frame being relatively movable thereon, gripper bars mounted on said last-named frame, toggle links connecting said gripper bars to open and close the same, said last-named frame including a star wheel having grooved abutments for engaging the toggle link mechanism to determine the open and closed position of the gripper bars, a ratchet wheel for indexing said star wheel, a pawl carried by the first-named frame for engaging and actuating said ratchet wheel, and stops in the path of travel of said gripper mechanism for holding said gripper bar frame during the continuing movement of the first-named frame, whereby to effect engagement of the pawl with the ratchet wheel to close the gripper bars at the receiving station for engaging a row of bottles on the first-named conveyor and for opening said gripper bars to release said bottles when delivered in transverse rows on the second-named conveyor.

3. Gripping mechanism for simultaneously gripping and transferring rows of bottles or the like comprising a pair of relatively movable frames, a plurality of gripping bars pivotally mounted on one of said frames, toggle links for engaging said gripper bars to expand and contract them in their gripping and releasing movements, a link connecting said toggle links being mounted on the other of said frames having a pivotal connection with said frame to be actuated in response to relative movement of said pair of frames, said first-named frame having a star wheel mounted thereon, the teeth of which constitute stop abutments for the pivotal member of the movable frame and the valleys between the teeth constituting similar abutments at a different radius than said first-named abutment, said star wheel having a ratchet wheel for indexing the same and a pawl carried by the other of said relatively movable frame members for indexing said ratchet and star wheel when the frames are subjected to relative movement.

ARCH L. STECK.

REFERENCES CITED

The following references are of record in the file of this patent:

UNITED STATES PATENTS

| Number | Name | Date |
|---|---|---|
| 870,713 | Christianson | Nov. 12, 1907 |
| 1,620,778 | Odom | Mar. 15, 1927 |
| 1,795,665 | Miller | Mar. 10, 1931 |
| 2,119,725 | Stecher | June 7, 1938 |
| 2,253,283 | Minaker | Aug. 19, 1941 |
| 2,332,058 | Cattonar et al. | Oct. 19, 1943 |